United States Patent Office 2,857,403
Patented Oct. 21, 1958

2,857,403
16-HALO TESTOSTERONE AND PROCESS

Josef Fried and Gordon H. Thomas, New Brunswick, N. J., assignors to Olin Mathieson Chemical Corporation, New York, N. Y., a corporation of Virginia No Drawing. Application February 7, 1957
Serial No. 638,674

13 Claims. (Cl. 260—397.3)

This invention relates to, and has for its object the provision of, a method of preparing 16-halo steroids of the androstane (including the androstene) series and to the physiologically active steroids produced thereby.

The compounds of this invention are produced by sulfonating 16α-hydroxyandrostenedione (which can be prepared as disclosed in the U. S. application of Josef Fried et al., Serial No. 453,411, filed August 31, 1954), reacting the 16α-sulfonyloxyandrostenedione with an alkali metal halide or alkaline earth metal halide to yield a 16-haloandrostenedione and, if desired, either reducing the 17-keto group to a 17-hydroxy grouping to yield a 16-halotestosterone or treating the 16-haloandrostenedione with a Grignard reagent to yield the corresponding 17α-substituted 16-halo-testosterone.

The compounds of this invention may be represented by the general formula:

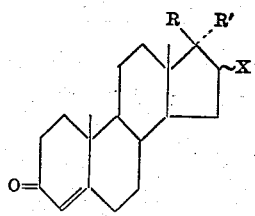

wherein individually R is hydroxy and R' is hydrogen or lower alkyl and together R and R' is keto, and X is halogen (which may be in either the alpha or beta position).

To prepare the compounds of this invention, 16α-hydroxy-androstenedione is treated with an organic sulfonating agent such as a lower alkane sulfonyl halide (e. g., mesyl chloride) or a monocyclic aromatic sulfonyl halide (e. g., tosyl chloride). This reaction is preferably conducted in the cold in the presence of an organic base, such as pyridine. The reaction results in the formation of a sulfonic acid ester of 16α-hydroxyandrostenedione (e. g., Δ⁴-androsten-16α-ol-3,17-dione 16α-mesylate).

The sulfonic acid ester formed is then reacted with an alkali metal halide (e. g., potassium fluoride, potassium hydrofluoride, lithium bromide and sodium iodide) or an alkaline earth metal halide (e. g., calcium chloride) to yield 16-haloandrostenedione, wherein the halide corresponds to the halogen ion of the reactant. The reaction is preferably conducted under substantially anhydrous conditions at an elevated temperature.

To form the 16-halotestosterones of this invention, the 17-keto group is reduced. The reduction may be accomplished either by protecting the 3-keto grouping (as by converting it to the 3-pyrrolidino-3,5-diene derivative by heating with pyrrolidine) and then treating with a reducing agent, such as lithium aluminum hydride, or directly by treating with a borohydride (e. g., sodium borohydride).

To form the 17α-lower alkyl derivatives of this invention, the pyrrolidino derivative is treated with a Grignard reagent (e. g., a lower alkyl magnesium iodide). The intermediate Grignard can then be decomposed and the pyrrolidino group hydrolyzed, as by treating with an acetate buffer, to form the 17α-(lower alkyl)-16-halo-testosterone derivative.

This series of steps can be represented by the following schematic analysis:

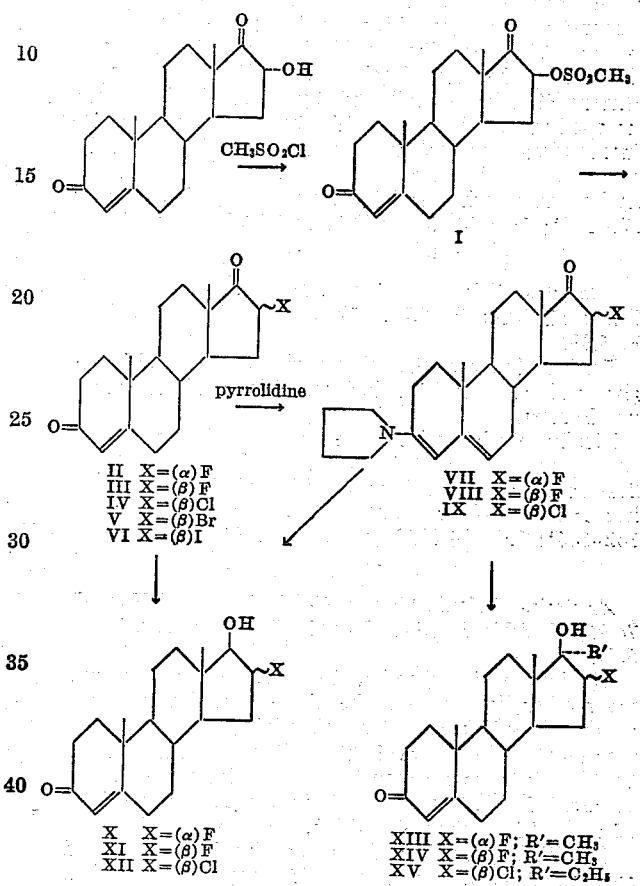

The compounds of this invention are physiologically active substances which possess androgenic activity. Thus, the compounds of this invention can be used in lieu of known androgenic steroids, such as testosterone and methyltestosterone, in the treatment of menopausal disorders, being formulated for such administration in the same type of preparations as testosterone, for example, with concentration and/or dosage based on the activity of the particular compound.

The following examples illustrate the invention (all temperatures being in centigrade):

EXAMPLE 1

Δ⁴-androsten-16α-ol-3,17-dione 16α-mesylate (I)

A solution of 16α-hydroxyandrostenedione (1 g.) and methanesulfonyl chloride (0.5 ml.) in pyridine (10 ml.) is allowed to stand at 0° for 18 hours. The mixture is then diluted with water, the precipitated material collected and washed with water. Crystallization from chloroform-methanol gives the pure 16α-mesylate (0.97 g.) melting at about 211–213°; $[\alpha]_D^{23}+149°$ (c, 1.13 in $CHCl_3$);

$\lambda_{max}^{Nujol}$ 5.67, 5.99, 619 μ

*Analysis.*—Calculated for $C_{20}H_{28}O_5S$ (380.48): C, 63.13; H, 7.40; S, 8.42. Found: C, 63.24; H, 7.03; S, 7.63.

EXAMPLE 2

16α-fluoro-Δ⁴-androstene-3,17-dione (II) and 16β-fluoro-Δ⁴-androstene-3,17-dione (III)

(a) *With potassium fluoride.*—A stirred solution of Δ⁴-androsten-16α-ol-3,17-dione 16α-mesylate (I) (2.8 g.) and anhydrous potassium fluoride (2.25 g.) in diethylene glycol (60 ml.) is heated at 110° for 18 hours. The mixture is then diluted with water and extracted with ether (6×50 ml.). The combined ether extracts are washed once with water, dried over sodium sulfate and evaporated to dryness in vacuo. The resultant gum (about 1.23 g.) is dissolved in benzene (15 ml.) and chromatographed on alumina (30 g.). Elution with benzene (300 ml.), followed by crystallization from acetone-hexane, gives about 164 mg. of isomer A (16β-fluoroandrostenedione) melting at about 166–169°. Further crystallization from acetone-hexane yields an analytical sample with the following properties, M. P. about 171–174°; $[\alpha]_D + 203°$ (c, 0.62 in CHCl₃);

$\lambda_{max}^{Nujol}$ 5.68, 5.96, 6.20μ

*Analysis.*—Calculated for C₁₉H₂₅O₂F (304.39): C, 74.95; H, 8.28; F, 6.24. Found: C, 74.98; H, 8.22; F, 6.33.

Further elution of the column with benzene (975 ml.) gives an intermediate fraction comprising a mixture of the two isomers.

Finally, elution with more benzene (200 ml.) and chloroform-benzene (1:9, 300 ml.), followed by crystallization from acetone-hexane, yields about 114 mg. of isomer B (16α-fluoroandrostenedione) melting at about 142–146°; $[\alpha]_D^{23} + 195°$ (c, 0.50 in CHCl₃);

$\lambda_{max}^{Nujol}$ 5.69, 5.89, 6.19

*Analysis.*—Calculated for C₁₉H₂₅O₂F (304.39): C, 74.95; H, 8.28; F, 6.24. Found: C, 75.19; H, 8.14; F, 6.71.

The intermediate fraction eluted from the column and the mother liquors from the above crystallizations are combined and the resultant material (about 470 mg.) rechromatographed on alumina. Crystallization of the best fractions from acetonehexane give isomer A (about 47 mg.), M. P. about 168–173°, and isomer B (about 95 mg.), M. P. about 144–149°.

(b) *With potassium hydrogen fluoride.*—A stirred solution of the 16α-mesylate (I) (500 mg.) and potassium hydrogen fluoride (500 mg.) in diethylene glycol (30 ml.) is heated at 110° for 18 hours under nitrogen. The product (about 342 mg.) obtained on isolation with ether is chromatographed on alumina (10 g.). Elution with benzene gives the two isomeric 16-fluoroandrostenediones identical in physical constants with those described above.

EXAMPLE 3

16β-chloro-Δ⁴-androstene-3,17-dione (IV)

A solution of Δ⁴-androsten-16α-ol-3,17-dione 16α-mesylate (I) (100 mg.) and calcium chloride (200 mg.) in absolute ethanol (5 ml.) is heated under reflux for 3 days. Water is added and the ethanol removed in vacuo. The steroids are extracted with chloroform, the chloroform solution washed with water, dried over sodium sulfate and the solvent removed in vacuo. The crystalline residue (about 75 mg.) melts at about 161–166°. The material is dissolved in benzene (5 ml.) and absorbed on acid-washed alumina 2 g.). Elution with a chloroform-benzene mixture (1:9, 100 ml.), followed by crystallization from acetone-hexane, yields the 16β-chloro compound (about 48 mg.) melting at about 171–174°; $[\alpha]_D + 181°$ (chloroform);

$\lambda_{max}^{alc}$ 237 mμ (ε=17,600); $\lambda_{max}^{Nujol}$ 5.72 6.01, 6.22μ

*Analysis.*—Calculated for C₁₉H₂₅O₂Cl (320.85): C, 71.10; H, 7.85; Cl, 11.05. Found: C, 70.85; H, 7.74; Cl, 10.89.

EXAMPLE 4

16β-bromo-Δ⁴-androstene-3,17-dione (V)

By following the procedure of Example 3, but substituting 200 mg. of lithium bromide for the calcium chloride, there is obtained 16β-bromo-Δ⁴-androstene-3,17-dione.

EXAMPLE 5

16β-iodo-Δ⁴-androstene-3,17-dione (VI)

By following the procedure of Example 3, but substituting 200 mg. of sodium iodide for the calcium chloride and 5 ml. of acetone for the alcohol, there is obtained 16β-iodo-Δ⁴-androstene-3,17-dione.

EXAMPLE 6

16β-fluoro-3-pyrrolidino-Δ³,⁵-androstadiene-17-one (VIII)

To a refluxing solution of 110 mg. of 16β-fluoro-Δ⁴-androstene-3,17-dione (III) in 1 ml. of methanol under nitrogen is added 0.1 ml. of redistilled pyrrolidine. Heating is continued for 2 minutes during which time crystals separate from solution. Evaporation of the solvent in vacuo leaves 16β-fluoro-3-pyrrolidino-Δ³,⁵-androstadiene-17-one, which melts at about 212–217° (dec.);

$\lambda_{max}^{Nujol}$ 5.70, 6.13, and 6.24μ

EXAMPLE 7

16α-fluoro-3-pyrrolidino-Δ³,⁵-androstadiene-17-one (VII)

By following the procedure of Example 6, but substituting 114 mg. of 16α-fluoro-Δ⁴-androstene-3,17-dione (II) for the 16β-fluoro derivative, there is obtained about 119 mg. of 16α-fluoro-3-pyrrolidino-Δ³,⁵-androstadiene-17-one (VII), which melts at about 206–218° (dec.).

EXAMPLE 8

16β-chloro-3-pyrrolidino-Δ³,⁵-androstadiene-17-one (IX)

To a refluxing solution of 16β-chloro-Δ⁴-androstene-3,17-dione (IV) (140 mg.) in methanol (3 ml.) under nitrogen is added redistilled pyrrolidine (0.3 ml.). Heating is continued for 2 minutes during which time crystals separate from solution. Evaporation of the solvent in vacuo leaves 16β-chloro-3-pyrrolidino-3,5-androstadiene-17-one, which melts at about 192–198° (dec.);

$\lambda_{max}^{Nujol}$ 5.71, 6.14, 6.26μ

*Analysis.*—Calculated for C₂₃H₃₂ONCl: C, 73.85; H, 8.63; Cl, 9.48; N, 3.75. Found: C, 74.52; H, 8.62; Cl, 9.00; N, 3.77.

Similarly, 16β-bromoandrostenedione (V) and 16β-iodoandrostenedione (VI) can be converted to their pyrrolidino derivatives.

EXAMPLE 9

16β-fluorotestosterone (XI)

A solution of 125 mg. of 16β-fluoro-3-pyrrolidino-Δ³,⁵-androstadiene-17-one (VIII) in 10 ml. of dry ether is stirred at room temperature with 150 mg. of lithium aluminum hydride for 45 minutes. After decomposing the metal complex with ice, there is added to the reduction mixture a buffer comprising 0.8 g. of sodium acetate, 2 ml. of water, 0.8 ml. of acetic acid and 10 ml. of methanol. The ether is boiled off, and the solution is then refluxed for four hours under nitrogen. The resulting mixture is extracted with chloroform, the chloroform extract washed with water, dilute bicarbonate solution and again with water, dried over sodium sulfate and the solvent evaporated in vacuo. The resulting material is dissolved in benzene (10 ml.) and absorbed on acid-washed alumina (3 g.). Elution with chloroform-benzene mixture (1:9, 60 ml.; 1:4, 60 ml.) followed by crystallization from acetone-hexane yields 16β-fluorotestosterone (about 60 mg.), M. P. about 163–165°. One crystallization from acetone-hexane gives an analytical sample which melts at about 165–168°

$\lambda_{max.}^{Nujol}$ 3.0, 6.07, 6.21μ

*Analysis.*—Calculated for $C_{19}H_{27}O_2F$ (306.41): C, 74.43; H, 8.88; F, 6.20. Found: C, 74.66; H, 8.75; F, 6.04.

EXAMPLE 10

16α-fluorotestosterone (X)

By following the procedure of Example 9, but substituting 119 mg. of 16α-fluoro-3-pyrrolidino-$\Delta^{3,5}$-androstadiene-17-one (VII) for the 16β-fluoro derivative, there is obtained about 102 mg. of 16α-fluorotestosterone which melts at about 137–152°. This material is dissolved in benzene (10 ml.) and absorbed on acid-washed alumina (3 g.). Elution with chloroform in benzene (1:9, 100 ml.; 1:4, 40 ml.), followed by crystallization from acetone-hexane, yields pure 16α-fluorotestosterone (about 45 mg.), M. P. about 153–158°; $[\alpha]_D+113°$ (c, 1.05 in chloroform)

$\lambda_{max.}^{Nujol}$ 2.89, 6.00, 6.18μ

*Analysis.*—Calculated for $C_{19}H_{27}O_2F$ (306.41): C, 74.43; H, 8.88; F, 6.20. Found: C, 74.50; H, 8.85; F, 5.99.

EXAMPLE 11

16β-chlorotestosterone (XII)

A solution of the 150 mg. of the pyrrolidine compound (IX) in 10 ml. of dry ether is stirred with 80 mg. of lithium aluminum hydride at room temperature for one hour. After decomposing the metal complex in ice, there is added to the reduction mixture a buffer comprising sodium acetate (0.8 g.), water (2 ml.), acetic acid (0.8 ml.) and methanol (10 ml.). The ether is boiled off, and the solution is then refluxed for 5 hours under nitrogen. The resulting mixture is extracted with chloroform, the chloroform extract washed with water, dilute bicarbonate solution and again with water, dried over sodium sulfate and the solvent evaporated in vacuo. The resulting material is dissolved in benzene (10 ml.) and absorbed on acid-washed alumina (3 g.). Elution with benzene (250 ml.) yields 16β-chlorotestosterone (about 37 mg.), M. P. about 174–186°. Two crystallizations from acetone-hexane gives a pure sample which melts at about 201–203°; $[\alpha]_D^{23}+88°$ (c, 1.22 in $CHCl_3$);

$\lambda_{max.}^{alc.}$ 239 mμ (17,200); $\lambda_{max.}^{Nujol}$ 2.90, 6.01, 6.21μ

*Analysis.*—Calculated for $C_{19}H_{27}O_2Cl$ (322.86): C, 70.66; H, 8.43; Cl, 10.96. Found: C, 70.95; H, 8.24; Cl, 10.98.

Similarly, 16β-bromo-3-pyrrolidino-$\Delta^{3,5}$-androstadiene-17-one and 16β-iodo-3-pyrrolidino-$\Delta^{3,5}$-androstadiene-17-one can be converted to 16β-bromotestosterone and 16β-iodotestosterone, respectively.

EXAMPLE 12

16α-fluorotestosterone (X)

To a solution of 100 mg. of 16α-fluoroandrostenedione in 20 ml. of methanol is added at 0°, 18 mg. of sodium borohydride. The mixture is allowed to remain at 0° for one hour, neutralized with 10% acetic acid to pH 6.0, diluted with 10 ml. of water and the methanol removed in vacuo. The residual suspension is extracted with chloroform, the chloroform extract washed with water, dried over sodium sulfate and evaporated to dryness in vacuo. The residual solid, after two recrystallizations from acetone-hexane, gives pure 16α-fluorotestosterone identical with that described in Example 10.

EXAMPLE 13

16α-fluoro-17α-methyltestosterone (XIII)

To a suspension of 300 mg. of 16α-fluoro-3-pyrrolidino-$\Delta^{3,5}$-androstadiene-17-one in 15 ml. of benzene and 8 ml. of anhydrous ether is added with exclusion of moisture and stirring under nitrogen 3 ml. of a solution of methylmagnesium iodide in ether. This latter solution is prepared freshly from 2 ml. of methyl iodide, 1 g. of magnesium and 10 ml. of dry ether. The resulting mixture is refluxed for two hours and the excess Grignard reagent decomposed with acetone (1 ml.) and methanol (1 ml.). The mixture is then concentrated to dryness in vacuo, taken up in 10 ml. of methanol and 1.5 ml. of water and, after the addition of 1.5 g. of sodium acetate and 1 ml. of glacial acetic acid, is refluxed for 4 hours. The yellow solution is concentrated in vacuo and taken up in chloroform and water. The chloroform phase is washed with dilute hydrochloric acid, dilute sodium bicarbonate and water, dried over sodium sulfate and evaporated to dryness in vacuo. The residue, after recrystallization from acetone-hexane, represents pure 16α-fluoro-17α-methyltestosterone (XIII).

In a similar manner, by substituting 16β-fluoro-3-pyrrolidino-$\Delta^{3,5}$-androstadiene-17-one (VIII) for the 16α-fluoro derivative in the procedure of Example 13, there is obtained 16β-fluoro-17α-methyltestosterone (XIV). Furthermore, if 16β - chloro - 3 - pyrrolidino - $\Delta^{3,5}$ - androstadiene-17-one (IX) is substituted for the 16α-fluoro derivative and ethyl magnesium iodide for the methylmagnesium iodide in the procedure of Example 13, there is obtained 16β-chloro-17α-ethyltestosterone (XV).

The invention may be otherwise variously embodied within the scope of the appended claims.

We claim:
1. A compound of the general formula

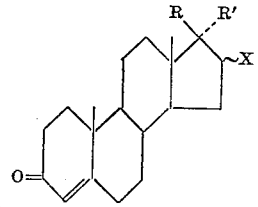

wherein individually R is hydroxy and R′ is selected from the group consisting of hydrogen and lower alkyl and together R and R′ is keto, and X is halogen.
2. 16-halo-$\Delta^4$-androstene-3,17-dione.
3. 16-fluoro-$\Delta^4$-androstene-3,17-dione.
4. 16β-Chloro-$\Delta^4$-androstene-3,17-dione.
5. 16-halotestosterone.
6. 16-fluorotestosterone.
7. 16β-Chlorotestosterone.
8. 16-halo-17α-(lower alkyl)testosterone.
9. A process for preparing 16-halo-$\Delta^4$-androstene-3,17-dione which comprises treating 16α-hydroxy-$\Delta^4$-androstene-3,17-dione with a sulfonating agent selected from the group consisting of a lower alkane sulfonyl halide and a monocyclic aromatic sulfonyl halide, and reacting the sulfonic acid ester formed with a compound selected from the group consisting of an alkali metal halide and an alkaline earth metal halide.
10. A process for preparing 16-halotestosterone which comprises heating 16-halo-$\Delta^4$-androstene-3,17-dione with pyrrolidine, treating the resultant 3-pyrrolidino-3,5-diene with lithium aluminum hydride, and recovering the 16-halotestosterone formed.
11. A process for preparing 16-halotestosterone which comprises treating 16-halo-$\Delta^4$-androstene-3,17-dione with a boro-hydride and recovering the 16-halotestosterone formed.
12. 16-halo-17α-methyltestosterone.
13. 16α-Fluoro-17α-methyltestosterone.

References Cited in the file of this patent
UNITED STATES PATENTS
2,695,260   Murray _____ Nov. 23, 1954